(12) United States Patent
Oh et al.

(10) Patent No.: US 10,878,262 B2
(45) Date of Patent: Dec. 29, 2020

(54) MULTI BIOMETRIC TERMINAL AND ACCESS CONTROL SYSTEM HAVING THE SAME

(71) Applicants: CRUCIALTEC CO.LTD., Seongnam-si (KR); CRUCIALTRAK, INC., Seongnam-si (KR)

(72) Inventors: Dong Hyun Oh, Seoul (KR); Yong Hee Han, Gwangju-si (KR); Dong Ho Lee, Seongnam-si (KR)

(73) Assignees: CRUCIALTEC CO.LTD., Seongnam-si (KR); CRUCIALTRAK, INC., Seongnam-si (KR)

( * ) Notice: Subject to any disclaimer, the term of this patent is extended or adjusted under 35 U.S.C. 154(b) by 0 days.

(21) Appl. No.: 16/485,992

(22) PCT Filed: Jan. 5, 2018

(86) PCT No.: PCT/KR2018/000258
§ 371 (c)(1),
(2) Date: Aug. 14, 2019

(87) PCT Pub. No.: WO2018/151411
PCT Pub. Date: Aug. 23, 2018

(65) Prior Publication Data
US 2020/0065598 A1    Feb. 27, 2020

(30) Foreign Application Priority Data
Feb. 14, 2017    (KR) .......................... 10-2017-0019811

(51) Int. Cl.
*G06K 9/00*    (2006.01)
*H04N 5/232*    (2006.01)
(Continued)

(52) U.S. Cl.
CPC ..... *G06K 9/00892* (2013.01); *G06K 9/00013* (2013.01); *G06K 9/00087* (2013.01);
(Continued)

(58) Field of Classification Search
None
See application file for complete search history.

(56) References Cited

U.S. PATENT DOCUMENTS

2001/0026632 A1*  10/2001  Tamai ................ G06K 9/00597
                                                                 382/116
2004/0202353 A1*  10/2004  Doi .................... G06K 9/00604
                                                                 382/115
(Continued)

FOREIGN PATENT DOCUMENTS

| JP | 2010-079633 A | 4/2010 |
|---|---|---|
| JP | 2012-173938 A | 9/2012 |
| KR | 10-0804798 B1 | 2/2008 |
| KR | 10-1281523 B1 | 7/2013 |
| KR | 10-2016-0040037 A | 4/2016 |

*Primary Examiner* — Hung Q Dang
(74) *Attorney, Agent, or Firm* — Novick, Kim & Lee, PLLC; Jae Youn Kim; Jihun Kim

(57) ABSTRACT

Disclosed herein is a multi biometric terminal that includes a host system capable of recognizing two or more physical features. The host system includes a biometric data input unit configured to acquire biometric data of a user, and a biometric data identification unit configured to compare the acquired biometric data with pre-registered biometric data of the user to perform identification. When a body of the user approaches in a non-contact manner, the biometric data input unit receives a plurality of types of biometric data from the body. The host system is accommodated in a single module or housing.

14 Claims, 7 Drawing Sheets

(51) Int. Cl.
 *G06K 9/20* (2006.01)
 *H04N 5/247* (2006.01)
 *G02B 1/115* (2015.01)
 *G02B 5/08* (2006.01)
 *G02B 1/11* (2015.01)
 *G06K 9/62* (2006.01)

(52) U.S. Cl.
 CPC ..... *G06K 9/00288* (2013.01); *G06K 9/00617* (2013.01); *G06K 9/00919* (2013.01); *G06K 9/00926* (2013.01); *G06K 9/209* (2013.01); *H04N 5/23299* (2018.08); *H04N 5/247* (2013.01); *G02B 1/115* (2013.01); *G02B 5/0825* (2013.01); *G06K 2009/00932* (2013.01)

(56) References Cited

U.S. PATENT DOCUMENTS

| | | | | |
|---|---|---|---|---|
| 2006/0013446 | A1* | 1/2006 | Stephens | H04M 1/67 382/115 |
| 2012/0016798 | A1* | 1/2012 | Carper | G06Q 20/1085 705/43 |
| 2012/0250954 | A1* | 10/2012 | Nada | G06K 9/00087 382/124 |
| 2012/0293642 | A1* | 11/2012 | Berini | G06F 21/34 348/77 |
| 2013/0155290 | A1* | 6/2013 | Huang | H04N 5/23296 348/240.1 |
| 2015/0356339 | A1* | 12/2015 | Demos | H04N 7/18 348/77 |
| 2019/0057201 | A1* | 2/2019 | Sahoo | G06Q 20/4014 |

\* cited by examiner

MULTI BIOMETRIC TERMINAL AND ACCESS CONTROL SYSTEM HAVING THE SAME

TECHNICAL FIELD

The present invention relates to a multi biometric terminal and an access control system having the same, and more particularly, to a multi biometric terminal capable of increasing a recognition success rate and speed of biometric data using a variety of biometric technologies, and an access control system having the same.

BACKGROUND ART

In general, biometrics is a technology that measures physical or behavioral features of living humans using an automated device to utilize them as a personal identification means.

Such biometrics may be classified into physical feature recognition and behavioral feature recognition. Examples of the physical feature recognition include fingerprint recognition, face recognition, iris recognition, vein recognition, retina recognition, and hand geometry recognition. Examples of the behavioral feature recognition include speech recognition, gait recognition, and signature recognition.

In order to increase the accuracy of the biometrics, in recent years, the physical feature recognition and the behavioral feature recognition are sometimes used in combination.

The physical feature recognition in the biometrics has been developed for a relatively long time, and is already used as a commercial security technology in various fields such as finance, access control, medical welfare, public service, quarantine, and entertainment.

However, when the fingerprint recognition, the face recognition, the iris recognition, the palm vein recognition, etc., which are related to the physical feature recognition, are individually applied to an authentication system, the following advantages and disadvantages exist.

First, the fingerprint recognition is advantageous in terms of high recognition rate, fast verification speed within 1 second, and so on. However, if a fingerprint is damaged or a finger is injured or bandaged, it is difficult to recognize the fingerprint.

The face recognition is advantageous in that a user is less reluctant to use a camera and can naturally be traced back by the user's photo submitted for reading. However, the face recognition is disadvantageous in that it is sensitive to light or an image's angle. In addition, if a face is disguised or changed over the years or plastic surgery is performed on the face, it is difficult to recognize the face.

The iris recognition is advantageous in that it is statistically more accurate than DNA analysis, it is almost impossible to replicate an iris, and the iris can be recognized even though glasses are worn. In addition, the iris rarely changes in life except by trauma or very rare disease. However, the iris recognition is disadvantageous in that it may be ideologically rejected depending on the recognition method, it is difficult to recognize the iris when a circle lens is worn, and the construction cost of system therefor is expensive.

The palm vein recognition is advantageous in that it can be used by people without fingerprints or fingers, a vein is less likely to be deformed due to trauma or aging since it is inside the human body, and it is almost impossible to replicate the vein. However, it is not easy to extract a portion over which the vein is distributed from the skin background of the dorsum of hand, and when the system therefor is constructed, its hardware configuration is complicated, its miniaturization is difficult, and its construction cost is expensive.

Due to these advantages and disadvantages, it may not be perfect to apply each biometric method to the authentication system. In other words, it is difficult to implement a system with high performance and reliability by only a single biometric feature.

Accordingly, there is a need for a system that can collectively recognize a plurality of biometric features to authenticate whether the user having the biometric features is registered in advance. In addition, it is necessary to solve in advance problems that may occur due to the use of such a system, for example, a problem that the system is complicated and causes a user inconvenience.

SUMMARY OF INVENTION

Technical Problem

It is an object of the present invention to provide a multi biometric terminal capable of simultaneous processing of biometrics by combining individual biometric technologies, and an access control system having the same.

It is another object of the present invention to provide a multi biometric terminal capable of preventing problems such as waste of time, inconvenience, and psychological resistance that may occur in the process of registering or identifying user's biometric information, and an access control system having the same.

The present invention is not limited to the above-mentioned objects, and other objects of the present invention can be clearly understood by those skilled in the art to which the present invention pertains from the following description.

Solution to Problem

To accomplish the above objects, in accordance with an aspect of the present invention, there is provided a multi biometric terminal that includes a host system capable of recognizing two or more physical features, wherein the host system includes a biometric data input unit configured to acquire biometric data of a user, and a biometric data identification unit configured to compare the acquired biometric data with pre-registered biometric data of the user to perform identification. When a body of the user approaches in a non-contact manner, the biometric data input unit receives a plurality of types of biometric data from the body. The host system is accommodated in a single module or housing.

In the aspect of the present invention, the biometric data may be two or more of fingerprint data, iris data, vein data, retina data, face image data, and hand geometry data.

In the aspect of the present invention, the biometric data input unit may receive a plurality of types of biometric data from the user's body when the user looks at the multi biometric terminal while approaching a position close to the multi biometric terminal from a position away therefrom.

In the aspect of the present invention, the biometric data input unit may include a fingerprint recognition means, a palm vein recognition means spaced apart from the fingerprint recognition means at a predetermined interval for photographing a palm, and an iris recognition means and a face recognition means positioned in a region corresponding between a thumb and an index finger of the user on one side of the palm vein recognition means.

In the aspect of the present invention, the fingerprint recognition means may have a plurality of fingerprint recognition cameras, a first fingerprint recognition camera of the fingerprint recognition cameras may photograph a predetermined number of fingerprints of remaining fingers except for the thumb, and a second fingerprint recognition camera of the fingerprint recognition cameras may photograph a fingerprint which is not photographed by the first fingerprint recognition camera from among the fingerprints of the remaining fingers except for the thumb.

In the aspect of the present invention, the iris recognition means and the face recognition means may be driven by a pan-tilt driver.

In the aspect of the present invention, the biometric data identification unit may simultaneously identify two or more types of acquired biometric data.

In the aspect of the present invention, the host system may further include a biometric data registration unit in which the biometric data of the user is registered in advance, and an ID display unit configured to display the identification result of the biometric data identification unit as an ID.

In the aspect of the present invention, the multi biometric terminal may further include a biometric data storage database configured to back up the user's biometric data registered in the biometric data registration unit. When the host system is disconnected from the multi biometric terminal, the user's biometric data registered in the biometric data registration unit may be deleted. When the host system is reconnected to the multi biometric terminal, the user's biometric data backed up to the biometric data storage database may be restored to the biometric data registration unit.

In the aspect of the present invention, the multi biometric terminal may further include a guide formed on a surface of the module or housing to guide an approach direction of a finger or palm of the user.

In the aspect of the present invention, the guide may guide the approach direction of the finger or palm by sight or touch.

To accomplish the above objects, in accordance with another aspect of the present invention, there is provided a multi biometric terminal capable of recognizing two or more physical features, which includes a fingerprint recognition means, a palm vein recognition means spaced apart from the fingerprint recognition means at a predetermined interval for photographing a palm, and an iris recognition means and a face recognition means spaced apart from the fingerprint recognition means and the palm vein recognition means at a predetermined interval for photographing an iris and face image of the user, respectively, and the fingerprint recognition means, the palm vein recognition means, and the iris recognition means and face recognition means are accommodated and modularized in a single housing.

In the aspect of the present invention, the iris recognition means and the face recognition means may be positioned adjacent to each other and driven by the same pan-tilt driver.

In the aspect of the present invention, the fingerprint recognition means may have a plurality of fingerprint recognition cameras for photographing respective separate fingerprints.

In the aspect of the present invention, the plurality of fingerprint recognition cameras may be arranged adjacent to each other, the palm vein recognition means may be disposed beneath the plurality of fingerprint recognition cameras, and the iris recognition means and the face recognition means may be disposed adjacent to one side of the palm vein recognition means.

In the aspect of the present invention, all or part of the housing may include a color optical resin layer for partially blocking visible light, a half-mirror coating layer provided on an upper surface of the color optical resin layer, and an anti-reflection coating layer provided on a lower surface of the color optical resin layer.

To accomplish the above objects, in accordance with still another aspect of the present invention, there is provided an access control system that includes a multi biometric terminal including a host system, and a gate for selecting a user identified from the host system to allow entry of the user, and the host system includes a biometric data input unit configured to, when a body of the user approaches in a non-contact manner, receive a plurality of types of biometric data from the body.

In the aspect of the present invention, the host system may be accommodated in a single module or housing.

In the aspect of the present invention, the host system may recognize physical features using two or more types of biometric data of fingerprint data, iris data, vein data, retina data, face image data, and hand geometry data.

To accomplish the above objects, in accordance with a further aspect of the present invention, there is provided a multi biometric terminal capable of recognizing two or more physical features, which includes two or more of a fingerprint recognition means, a palm vein recognition means, an iris recognition means, and a face recognition means. The two or more means are accommodated and modularized in a single housing, and the housing includes an upper member disposed on a side for receiving biometric information from a user, and a lower member directly coupled to the upper member or indirectly coupled thereto through another member. The upper member includes a color optical resin layer for partially blocking visible light, a half-mirror coating layer provided on an upper surface of the color optical resin layer, and a first anti-reflection coating layer provided on a lower surface of the color optical resin layer.

In the aspect of the present invention, a ratio (b/a) of the incident amount (a) of visible light incident into the upper member through the upper member from the outside of the upper member and the reflection amount (b) of visible light reflected by the upper member from the inside of the upper member and incident into the upper member may be 30% or less.

In the aspect of the present invention, the upper member may further include a second anti-reflection coating layer provided between the color optical resin layer and the half-mirror coating layer.

In the aspect of the present invention, a cured coating layer or an anti-fingerprint coating layer may be further provided on the upper surface of the half-mirror coating layer.

Advantageous Effects of Invention

Exemplary embodiments of the present invention can provide a multi biometric terminal capable of simultaneously recognizing and identifying a plurality of living bodies by combining independent biometric technologies, and an access control system having the same. In addition, the multi biometric terminal and the access control system having the same can provide an aesthetically superior and user-friendly user interface.

In accordance with the exemplary embodiments of the present invention, it is possible to reduce the time required for or inconvenience of registration and identification of biometric data, and to reduce psychological resistance in the process of biometrics. Particularly, the multi biometric terminal can reduce user rejection or discomfort since it has a high biometric information recognition rate and its internal device is invisible to the user.

The present invention is not limited to the above effects, and it should be understood that the present invention includes all effects which can be inferred from the following detailed description of the present invention or the configuration of the invention defined by the appended claims.

DESCRIPTION OF EMBODIMENTS

Figure 1:
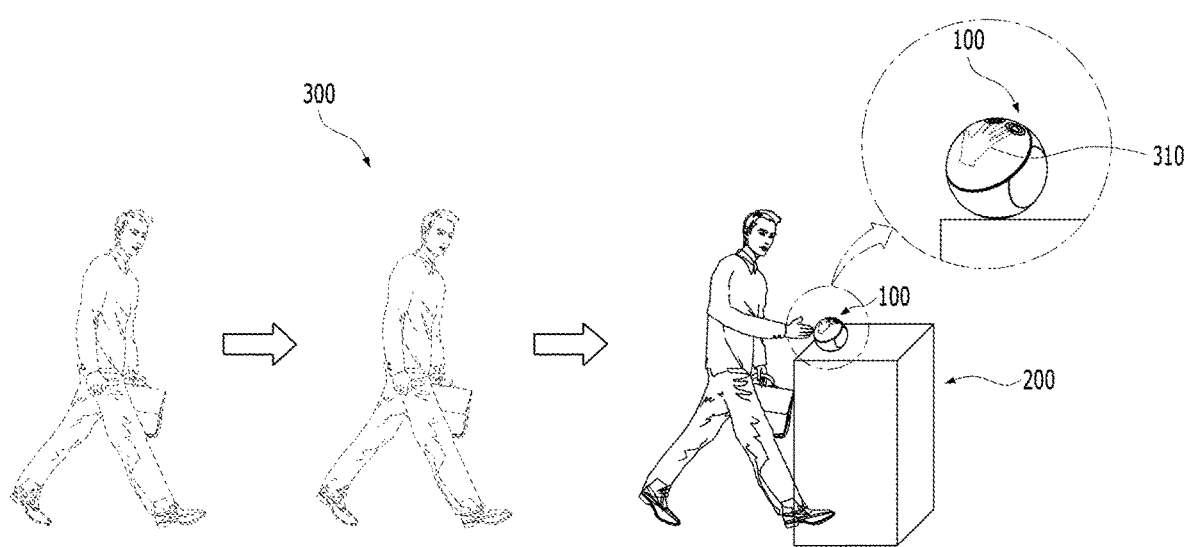
FIG. 1 is a view illustrating a state in which a user approaches a multi biometric terminal to obtain authentication for passing through a gate.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings. Although a multi biometric terminal is described for the purpose of passing through a gate (access security gate) for ease of description in the present embodiments, it should be appreciated that the present invention is not limited thereto and can be applied to all systems related to security.

FIG. 1 is a view illustrating a state in which a user approaches a multi biometric terminal to obtain authentication for passing through a gate. Here, the multi biometric terminal, which is designated by reference numeral 100, is a device that includes a host system capable of recognizing two or more physical features, and details thereof will be described later.

Referring to FIG. 1, the multi biometric terminal 100 according to the present invention is a device capable of identifying a user 1 when the body of the user 1 approaches in a non-contact manner. In addition, it is possible to identify the user 1 even when the user 1 looks at the multi biometric terminal 100 while approaching from the outside in a non-contact manner.

When user recognition and identification are completed through the multi biometric terminal 100, the user 1 may pass through a gate 700. The gate 700 may be implemented in various forms such as a swing door and a sliding door, and the structure and shape thereof are not particularly limited. A guide 180 illustrated in FIG. 1 will be described later.

In the present invention, the user's body "approaching in a non-contact manner" means that the user's body, such as a finger or a palm or a face, approaches a position close to the multi biometric terminal 100 from a position away therefrom while the user's body does not come into contact with the multi biometric terminal 100. That is, the user experience provided by the multi biometric terminal 100 according to the present invention excludes an operation in which recognition or identification is performed only when the user's body is in contact with the multi biometric terminal 100 or the user's finger or palm is swung in a slot.

In order for the user 1 to pass through the gate 700, the user 1 must authenticate himself/herself through the multi biometric terminal 100. To this end, the user 1 provides his/her biometric information to the multi biometric terminal 100, and the multi biometric terminal 100 may perform identification by comparing biometric data acquired from the user 1 with pre-registered biometric data of the user 1.

In order for the user 1 to provide his/her biometric information to the multi biometric terminal 100, the user 1 looks at the multi biometric terminal 100 while approaching the multi biometric terminal 100 with, for example, his/her finger or palm. That is, while the user 1 performs the above-mentioned action, a biometric data input unit 1100 of a host system 1000 mounted in the multi biometric terminal 100 acquires the biometric data of the user 1. The host system 1000 will be described in more detail later with reference to FIG. 2, and only the function thereof will be schematically described now.

The biometric data input unit 1100 of the host system 1000 may acquire biometric data (fingerprint data or palm vein data) through the finger or palm of the user 1 approaching from the outside. In addition, the biometric data input unit 1100 may acquire biometric data (iris data or face image data) through the iris or face of the user 1 approaching from the outside while looking.

That is, the biometric data input unit 1100 may acquire two or more types of biometric data of the user 1. For example, the biometric data input unit 1100 may acquire two or more of fingerprint data, vein data (e.g., palm vein data), iris data, and face image data.

The time it takes to acquire the biometric data of the user 1 is usually the fastest in the face recognition, is medium in the iris or fingerprint recognition, and is the slowest in the vein recognition. However, since the time interval required to acquire each type of biometric data is very short, the user 1 can recognize that each type of biometric data is recognized at about the same time.

Meanwhile, a biometric data identification unit 1300 of the host system 1000 compares the biometric data of the user 1 acquired as described above with the pre-registered biometric data of the user 1 to perform identification. Here, the biometric data identification unit 1300 may simultaneously identify two or more types of acquired biometric data. Of course, a time difference for identification may occur according to the type or amount of the pre-registered biometric data of the user 1. In addition, the biometric data identification unit 1300 may display biometric data which is first identified from among individual types of biometric data to the outside through a display or the like such that a security administrator may check the biometric data.

Since the multi biometric terminal 100 receives a plurality of types of biometric data, it is possible to set various access permission conditions. For example, it is possible to permit access based on any biometric data that is first recognized and identified from among two or more types of biometric data. In this case, quick access is possible.

On the other hand, it is possible to permit access only when two or more types of biometric data are all recognized and identified. In this case, security conditions are strengthened, and the probability of access permission due to misrecognition or security accident is lowered.

It is also possible to set access permission conditions that combine the above two cases. For example, when the vein (palm vein) or iris with high accuracy, stability, and security of the data is recognized and identified, it is possible to permit access based on only one type of biometric data. On the other hand, when the face image with relatively low accuracy and stability of data is recognized and identified, it is possible to increase security by requiring recognitions and identification of other types of biometric data, e.g., the fingerprint or the iris together. Besides, it is possible to set various access permission conditions in consideration of a security demand level, an identification speed, or the like.

Figure 2:
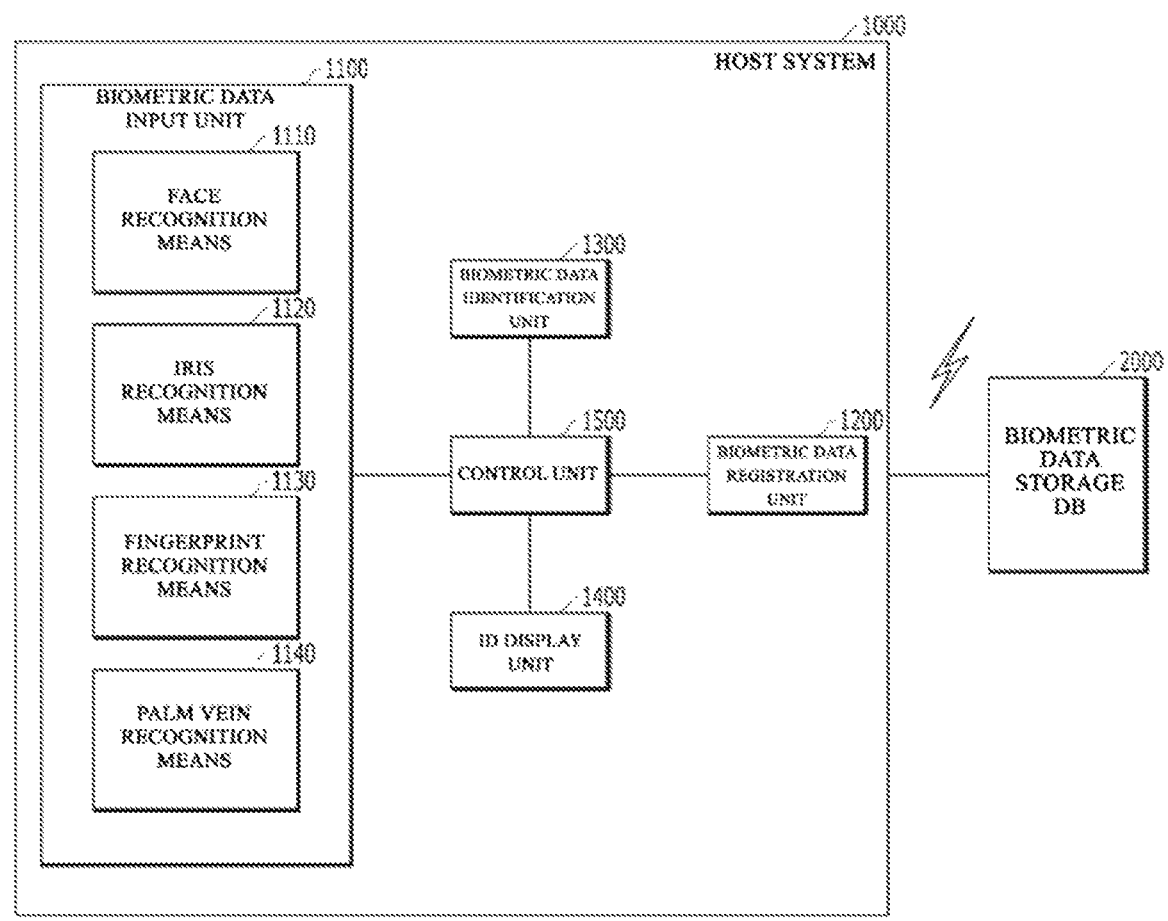
FIG. 2 is a block diagram illustrating a host system in a multi biometric terminal according to an embodiment of the present invention.

Next, the configuration of the host system 1000 according to the embodiment of the present invention will be described in detail. FIG. 2 is a block diagram illustrating the host system in the multi biometric terminal according to the embodiment of the present invention.

Referring to FIG. 2, the host system 1000 of the multi biometric terminal 100 according to the present invention may include a biometric data input unit 1100, a biometric data registration unit 1200, and a biometric data identification unit 1300. The host system 1000 may further include an ID display unit 1400 and a control unit 1500.

The biometric data input unit 1100 may acquire the biometric data of the user 1. The biometric data may be, for example, fingerprint data, iris data, vein data, retina data, face image data, or hand geometry data. The biometric data input unit 1100 may receive two or more of the types of biometric data.

The biometric data input unit 1100 may include a face recognition means 1110, an iris recognition means 1120, a fingerprint recognition means 1130, and a palm vein recognition means 1140.

The fingerprint recognition means 1130 may be physically positioned above the upper surface of the multi biometric terminal 100. The palm vein recognition means 1140 may be spaced apart from the fingerprint recognition means 1130 at a predetermined interval. The iris recognition means 1120 and the face recognition means 1110 may be positioned in a region corresponding between the thumb and the index finger of the user on one side of the palm vein recognition means 1140.

The fingerprint recognition means 1130 may have a plurality of fingerprint recognition cameras, which may each acquire fingerprint data and be arranged adjacent to each other. The palm vein recognition means 1140 may be disposed beneath the plurality of fingerprint recognition cameras. The iris recognition means 1120 and the face recognition means 1110 may be disposed adjacent to one side of the palm vein recognition means 1140. Details thereof can be understood through the matters illustrated in FIG. 3, which will be described later.

Figure 3:
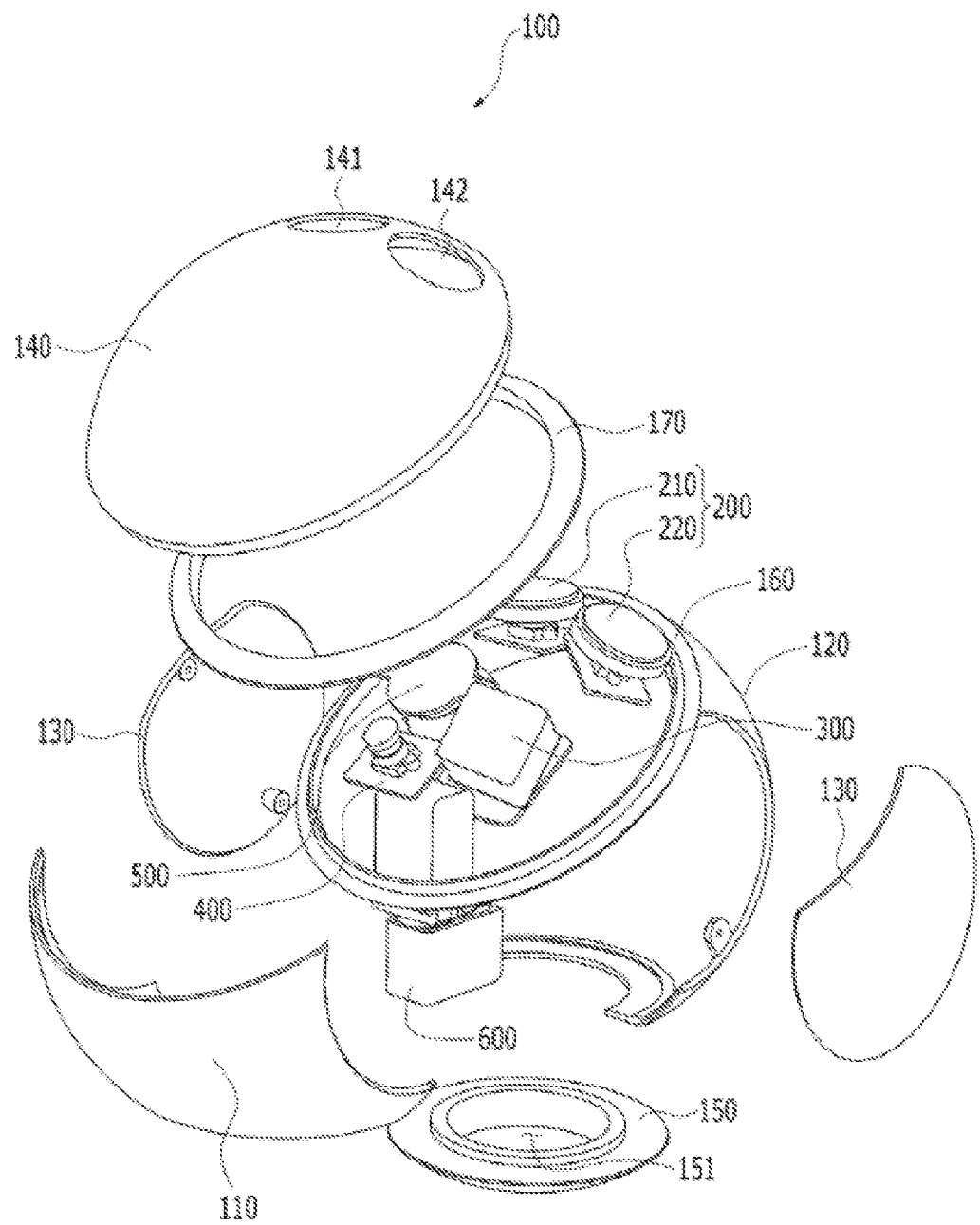
FIG. 3 is an exploded perspective view illustrating the multi biometric terminal according to the embodiment of the present invention.

The face recognition means 1110 may be a means for recognizing face image data, for example, for recognizing image data photographed by a face recognition camera 400 illustrated in FIG. 3. That is, the face recognition means 1110 may be a face recognition camera 400 itself, or alternatively, may be a module including the face recognition camera 400. For example, the face recognition means 1110 may be a module including a face recognition camera 400 and a processor (not illustrated) for processing image data photographed by the face recognition camera 400.

The iris recognition means 1120 may be a means for recognizing iris data, for example, for recognizing iris data photographed by an iris recognition camera 500 illustrated in FIG. 3. That is, the iris recognition means 1120 may be an iris recognition camera 500 itself, or alternatively, may be a module including the iris recognition camera 500. For example, the iris recognition means 1120 may be a module including an iris recognition camera 500 and a processor (not illustrated) for processing image data photographed by the iris recognition camera 500.

The fingerprint recognition means 1130 may be a means for recognizing fingerprint data, for example, for recognizing fingerprint data photographed by a plurality of fingerprint recognition cameras 200 illustrated in FIG. 3. That is, the fingerprint recognition means 1130 may be a plurality of fingerprint recognition cameras 200, which may each acquire fingerprint data, or alternatively, may be a module including the plurality of fingerprint recognition camera 200. For example, the fingerprint recognition means 1130 may be a module including a plurality of fingerprint recognition cameras 200 and a processor (not illustrated) for processing image data photographed by the fingerprint recognition cameras 200.

The palm vein recognition means 1140 may be a means for recognizing palm vein data, for example, for recognizing palm vein data photographed by a palm vein recognition camera 300 illustrated in FIG. 3. That is, the palm vein recognition means 1140 may be a palm vein recognition camera 300 itself, or alternatively, may be a module including the palm vein recognition camera 300. For example, the palm vein recognition means 1140 may be a module including a palm vein recognition camera 300 and a processor (not illustrated) for processing image data photographed by the palm vein recognition camera 300.

Although the biometric data input unit 1100 is described as including the face recognition means 1110, the iris recognition means 1120, the fingerprint recognition means 1130, and the palm vein recognition means 1140 for ease of description in the present embodiment, the present invention is not limited thereto. The biometric data input unit 1100 may have other biometric recognition means. For example, the biometric data input unit 1100 may also have a finger vein recognition means, a retina recognition means, or a hand geometry recognition means.

Continuing to refer to FIG. 2, the biometric data of the user 1 may be registered in advance in the biometric data registration unit 1200.

The biometric data identification unit 1300 may perform identification by comparing the biometric data acquired from the biometric data input unit 1100 with the biometric data of the user 1 registered in advance in the biometric data registration unit 1200.

The ID display unit 1400 may display the identification result of the biometric data of the user 1, identified by the biometric data identification unit 1300, as an ID. The identification result of the ID display unit 1400 may be checked by the security administrator or the user 1.

The control unit 1500 is connected to the biometric data input unit 1100, the biometric data registration unit 1200, the biometric data identification unit 1300, and the ID display unit 1400, and serves to instruct them to perform respective operations.

Hereinafter, a process of registering, recognizing, and identifying biometric data using the multi biometric terminal 100 according to the present invention will be described.

First, the user or the administrator must register the biometric data of the user 1 in the multi biometric terminal 100. Registering the biometric data of the user 1 is basically an act of extracting and storing features of the user 1. All types of biometric data of the user 1 acquired as described above may be stored in the biometric data registration unit 1200. All types of biometric data of the user 1 stored in the biometric data registration unit 1200 may be backed up to a biometric data storage database 2000 for preservation of data. The host system 1000 of the multi biometric terminal 100 and the biometric data storage database 2000 may be interconnected by wire or wirelessly. Details of the biometric data storage database 2000 will be described later.

Next, in order for the user 1 to pass through the gate 700, the user 1 must authenticate himself/herself. To this end, the user 1 inputs his/her biometric data through the biometric data input unit 1100.

When the biometric data input unit 1100 receives the biometric data of the user 1, the biometric data identification unit 1300 compares the biometric data of the user 1 input thereto with the biometric data of the user 1 registered in the biometric data registration unit 1200 to identify whether the identity of the user is correct. In this case, the biometric data identification unit 1300 may perform authentication to verify the identity of the user by one-to-one matching, or may perform identification to find the user 1 form among many people by 1-to-N matching. That is, strictly speaking, authentication and identification are separate and selectively used according to the application area. However, the term "authentication" or "identification" in the present invention refers to a process of verifying or finding an identity using biometric data and is interpreted broadly. However, in the present embodiment, the biometric data identification unit 1300 is described as performing identification by 1-to-N matching between one user and a plurality of users.

The data stored in the biometric data registration unit 1200 is data registered with all types of biometric data of the user 1, and the biometric data input unit 1100 may receive a predetermined number or more types of data from among the plurality of types of biometric data of the user 1.

In more detail, when the biometric data of the user 1 is input from the biometric data input unit 1100, the biometric data identification unit 1300 identifies the biometric data and a plurality of users' biometric data registered in the biometric data registration unit 1200. In this case, the biometric data of the user 1 input to the biometric data input unit 1100 may be a plurality of types of biometric data. That is, the biometric data of the user 1 may be two or more of iris data, face image data, fingerprint data, and palm vein data. Accordingly, the biometric data identification unit 1300 performs identification from the plurality of types of biometric data registered in the biometric data registration unit 1200 according to the number of types of biometric data of the user 1 input to the biometric data input unit 1100.

For example, when the biometric data of the user 1 input to the biometric data input unit 1100 is iris data or fingerprint data, the biometric data identification unit 1300 may perform identification using the iris data or fingerprint data of a plurality of users registered in the biometric data registration unit 1200. Of course, when the biometric data of the user 1 input to the biometric data input unit 1100 is one or three or more according to the setting, the biometric data identification unit 1300 may perform identification from the plurality of types of biometric data registered in the biometric data registration unit 1200 according to the number of types of biometric data of the user 1 input to the biometric data input unit 1100.

The result of performing such identification may be displayed by the ID display unit 1400 of the host system 1000. The ID display unit 1400 may sequentially display the completed identification result of the biometric data from among the plurality of types of biometric data of the user 1.

For example, assume that the biometric data identification unit 1300 identifies iris data, face image data, and fingerprint data. In this case, when the identification of the biometric data is performed in the order of face image data, fingerprint data, and iris data, the ID display unit 1400 may display the identification results in order of face image data, fingerprint data, and iris data.

Even when all of the above three identification results (iris, face, and fingerprint) do not succeed and only one or two succeed, it may be displayed that the identification of the user 1 is successful depending on the setting. When all of the three identification results do not succeed or some of them do not succeed, it may be displayed that the identification of the user 1 is failed depending on the setting. As described above, it is possible to set various access conditions.

Referring to FIG. 2 again, the host system 1000 according to the present embodiment may further include a biometric data storage database 2000 that backs up data registered in the biometric data registration unit 1200. If problems such as artificial mistakes, hardware problems, software problems, thefts, computer viruses, cyber terrorisms, or disasters occur, the biometric information of the user 1 registered in the biometric data registration unit 1200 may be lost. Therefore, the data of the biometric data registration unit 1200 may be set to be regularly backed up to the biometric data storage database 2000.

The biometric data storage database 2000 that backs up the data of the biometric data registration 1200 may be used as a tamper protection function. That is, when the host system 1000 is disconnected from the multi biometric terminal 100, all types of data registered in the biometric data registration unit 1200 may be deleted. In contrast, when the host system 1000 is reconnected to the controller, the data backed up to the biometric data storage database 2000 may be restored to the biometric data registration unit 1200. The same may be applied to the case where the host system 1000 is disconnected from or reconnected to the controller of the gate 700.

Accordingly, loss of the biometric data, which is personal information, can be prevented even though the multi biometric terminal 100 including the host system 1000 according to the present invention is lost due to theft or the like. That is, when the host system 1000 existing in the multi biometric terminal 100 according to the present invention is disconnected from the multi biometric terminal 100 or the controller of the gate 700, all types of data registered in the biometric data registration unit 1200 are deleted, thereby preventing the biometric data of the user from leaking in advance. When the disconnected host system 1000 of the multi biometric terminal 100 is reconnected to the controller of the gate 700, all types of data backed up to the biometric data storage database 2000 are restored to the biometric data registration unit 1200. Therefore, even when the multi biometric terminal 100 is disconnected from and then reconnected to the gate 700 by mistake or for the purpose of repair and management, the trouble of re-input of the biometric data does not occur.

Figure 4:
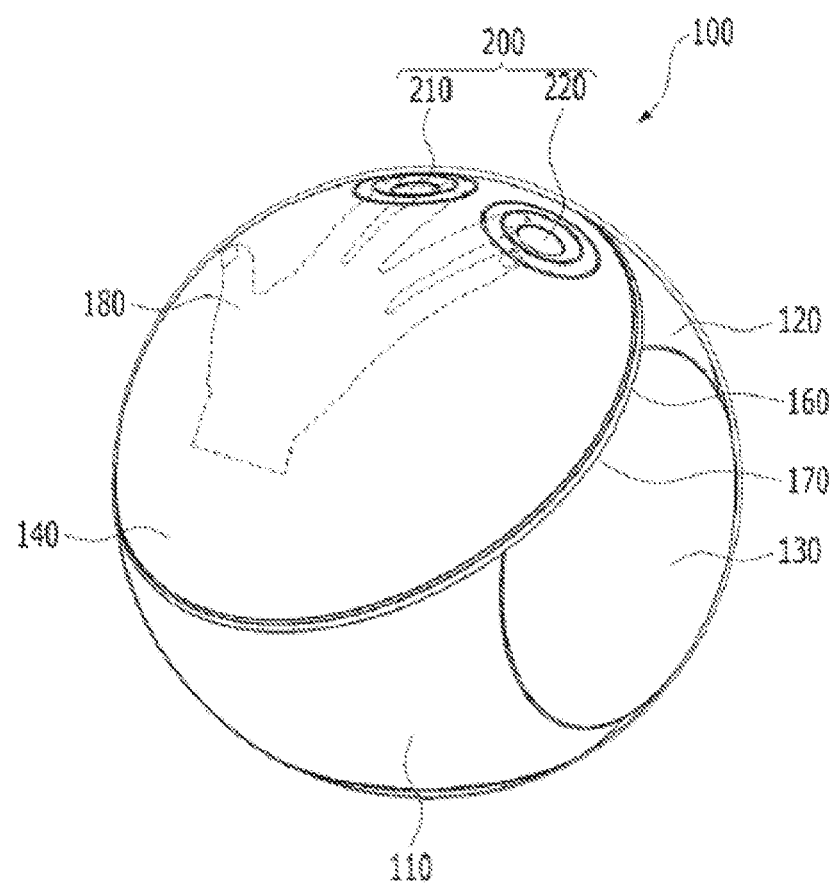
FIG. 4 is an assembled perspective view illustrating the multi biometric terminal according to the embodiment of the present invention.

Next, a specific implementation of the multi biometric terminal according to the present invention will be described with reference to the drawings. FIG. 3 is an exploded perspective view illustrating the multi biometric terminal according to the embodiment of the present invention. FIG. 4 is an assembled perspective view illustrating the multi biometric terminal according to the embodiment of the present invention.

The multi biometric terminal 100 including a spherical housing, the inside of which is hollow, is illustrated in the drawings. However, it should be appreciated that the multi biometric terminal 100 according to the present invention is not limited to having the spherical housing, but may have various shapes of housings.

The multi biometric terminal 100 or the host system 1000 according to the present invention may be accommodated in a single module or housing. Here, the term "accommodated in a single module or housing" means that the means for recognizing a plurality of types of biometric data are not accommodated in separate modules or housings so that the recognition of the biometric data is not performed in separate devices or the setting or position adjustment of the means for recognizing the biometric data is not performed individually. That is, the means for recognizing a plurality of types of biometric data are provided and modularized in a single device. Here, the module or the housing may be provided in one piece, or alternatively, may be combined with a plurality of outer shells (or members).

In other words, the fingerprint recognition means, the palm vein recognition means, the iris recognition means, and the face recognition means may be accommodated and modularized in a single housing, and the technical meaning thereof is the same as above.

Referring to FIG. 3, the multi biometric terminal 100 according to the present invention may be combined with six outer shells. That is, the outer shells of the multi biometric terminal 100 may be a front member 110, a rear member 120, two side members 130 positioned at both sides thereof, an upper member 140, and a lower member 150. The spherical housing, the inside of which is hollow, may be provided by combining the six members.

The two side members 130 may be installed detachably from the rear member 120. The system administrator may mount the host system 1000 or the biometric module in the multi biometric terminal 100 or facilitate maintenance and repair activities by opening the side members 130.

The upper member 140 may be attached to a region inclined at a predetermined angle in the vertical direction in consideration of the user's convenience (accessibility). Accordingly, when the finger or palm of the user 1 approaches the multi biometric terminal 100, the user 1 may maintain a more comfortable posture. The upper member 140 may be made of a half mirror. The structure of the upper member 140 will be described in detail later.

The lower member 150 may have a first through-hole 151 in the center thereof. The first through-hole 151 may be provided to interconnect the multi biometric terminal 100 and the controller of the gate 700. The front member 110 and the rear member 120 may be in the form of a spherical housing as a whole. The front member 110, the rear member 120, the both side members 130, and the upper member 140 except for the lower member 150 may be fixed by a ring-shaped fixing member 160.

In addition, a plurality of second through-holes 141 and 142 may be provided at one side of the upper member 140 positioned in the region inclined at a predetermined angle in the vertical direction. The fingerprint recognition cameras 200 may be inserted into the plurality of second through-holes 141 and 142, respectively. The plurality of second through-holes 141 and 142 may include a 2-1 through-hole 141 and a 2-2 through-hole 142. The first fingerprint recognition camera 210 inserted into the 2-1 through-hole 141 photographs a predetermined number of fingerprints of the remaining fingers except for the thumb. The second fingerprint recognition camera 220 inserted into the 2-2 through-hole 142 may photograph a fingerprint which is not photographed by the first fingerprint recognition camera 210 from among the fingerprints of the remaining fingers except for the thumb.

For example, when the first fingerprint recognition camera 210 photographs a second fingerprint, a third fingerprint, and a fourth fingerprint of the user 1, the second fingerprint recognition camera 220 may photograph a fifth fingerprint of the user 1. On the other hand, the first fingerprint recognition camera 210 may photograph only the second fingerprint of the user 1, and the second fingerprint recognition camera 220 may photograph the third, fourth, and fifth fingerprints of the user 1. That is, the fingerprint recognition cameras 200 simultaneously photograph the four fingerprints of the remaining fingers except for the thumb of the user 1. Here, the fingerprint recognition cameras 200 may photograph the fingerprints of the user 1 in a touchless manner in which the fingers of the user 1 do not touch the multi biometric terminal 100. Similarly, the palm vein recognition camera 300 may photograph the palm vein data of the user 1 in a touchless manner in which the palm of the user 1 does not touch the multi biometric terminal 100.

When the user views the upper member 140 from the outside, the palm vein recognition camera 300 may be positioned beneath the fingerprint recognition cameras 200 at a predetermined interval. The user 1 approaches his/her palm to the multi biometric terminal 100 to input his/her biometric data to the biometric data input unit 1100 of the multi biometric terminal 100. When the user 1 approaches the fingerprint recognition cameras 200 of the multi biometric terminal 100 with his/her fingers, the palm of the user 1 may be automatically aligned at a position facing the palm vein recognition camera 300. In addition, the iris recognition camera 500 and the face recognition camera 400 may be positioned above and beneath one side of the palm vein recognition camera 300, respectively. The iris recognition camera 500 and the face recognition camera 400 may photograph the iris and face of the user 1 between the thumb and the index finger of the user 1, respectively. Although the iris recognition camera 500 is positioned above the face recognition camera 400 in the present disclosure, the present invention is not limited thereto. The positions of the face recognition camera 400 and the iris recognition camera 500 may be interchanged. Meanwhile, other biometric cameras (e.g., a retina recognition camera) may be positioned located instead of the iris recognition camera 500 or the face recognition camera 400.

The iris recognition camera 500 and the face recognition camera 400 may be driven by a pan-tilt driver 600. That is, the iris recognition camera 500 or the face recognition camera 400 may photograph the iris or face of the user 1 while moving or rotating in the horizontal direction or the vertical direction by the pan-tilt driver 600. By such physical movement, the pan-tilt driver 600 may perform mechanical (non-optical) zoom in and zoom out functions, and the iris recognition camera 500 or the face recognition camera 400 may thus photograph the iris or face of the user 1 while adjusting or focusing it. Of course, the iris recognition camera 500 or the face recognition camera 400 may have optical zoom in and zoom out functions. Thus, the iris recognition camera 500 and the face recognition camera 400 may be implemented simultaneously with or separately from the non-optical zoom in/out functions by the pan-tilt driver.

By the above-mentioned configuration, the user 1 does not need to authenticate his/her iris or face by approaching it to the iris recognition camera 500 or the face recognition camera 400. That is, by the pan-tilt driver 600, the iris recognition camera 500 or the face recognition camera 400 may always photograph the iris or face of the user 1 at a constant size regardless of distance. In addition, the iris recognition camera 500 and the face recognition camera 400 may be adjacent to each other and driven by the same pan-tilt driver 600. Although not illustrated, the iris recognition camera 500 and the face recognition camera 400 may be individually driven by separate pan-tilt drivers.

A ring-shaped light source 170 may be mounted between the upper member 140 and the fixing member 160. The light source 170 may have a functional effect of leading the finger or palm of the user 1 together with a decorative or aesthetic effect.

Referring to FIG. 4, a guide 180 may be provided on the surface of the upper member 140 of the multi biometric terminal 100. The guide 180 may guide the approach direction of the user's finger or palm, for example, may guide the approach direction of the finger or palm by sight or touch.

The multi biometric terminal 100 according to the embodiment of the present invention is a device to identify the user 1 when the finger or palm of the user 1 approaches from the outside in a non-contact manner. In addition, the multi biometric terminal 100 is a device to identify the user 1 even when the user 1 looks at the multi biometric terminal 100 while approaching from the outside. Accordingly, the finger and palm of the user 1 must be easy to approach the multi biometric terminal 100. The guide 180 may be provided for guiding such an approach.

The guide 180 may, for example, display a finger or palm shape by a light source, but the present invention is not, of course, limited thereto. The guide 180 may be displayed by transparent ink.

As another example, a palm shape may be displayed in a separate color or a structure such as protrusions and/or recesses may be provided. In addition, it is possible to provide an air discharge unit to induce the user to approach the multi biometric terminal 100 by detecting the wind.

Figure 5:
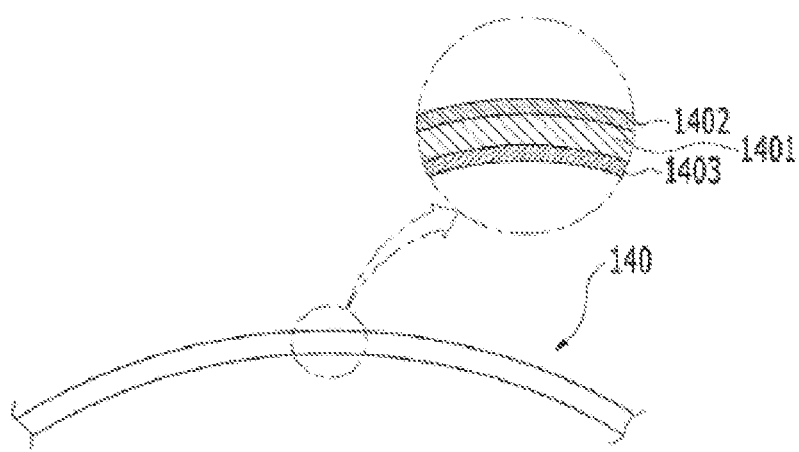
FIG. 5 is a cross-sectional view schematically illustrating a housing of the multi biometric terminal according to the embodiment of the present invention.
Figure 6:
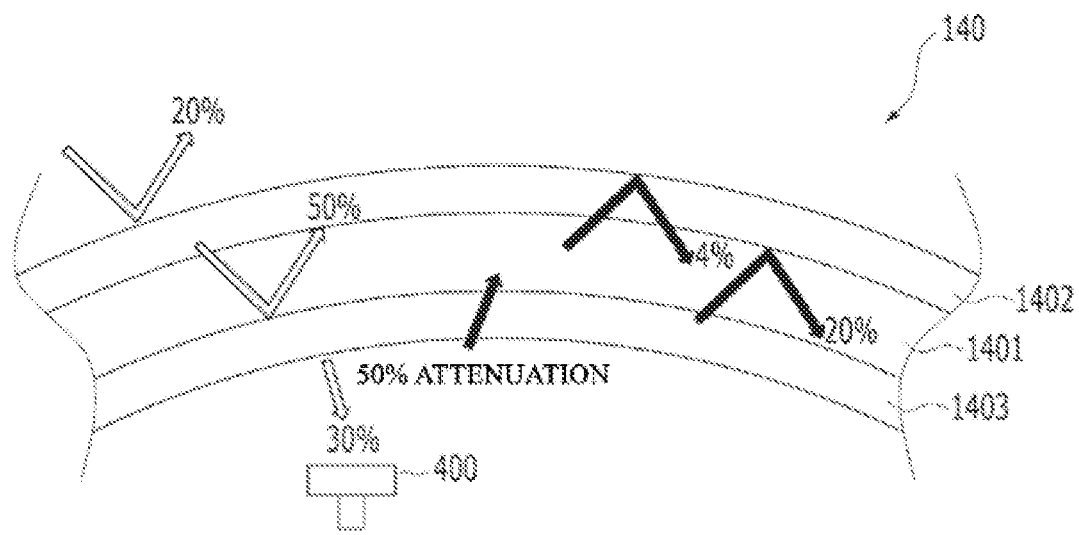
FIG. 6 is a view for explaining light incidence and reflection in the housing of FIG. 5.
Figure 7:
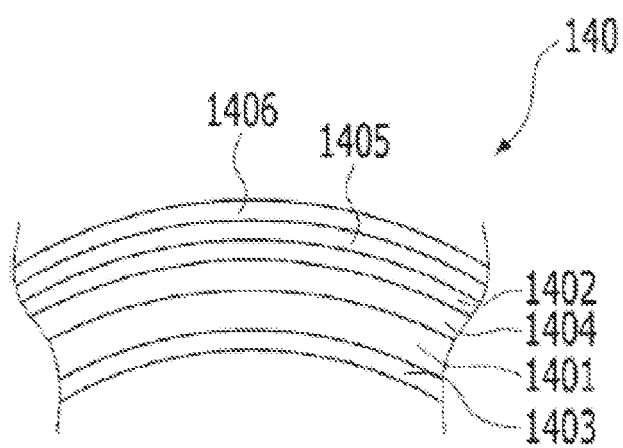
FIG. 7 is a cross-sectional view schematically illustrating a state in which coating layers are added to the housing of FIG. 5.

Hereinafter, the cross-sectional structure of the housing will be described. FIG. 5 is a cross-sectional view schematically illustrating the housing of the multi biometric terminal according to the embodiment of the present invention. FIG. 6 is a view for explaining light incidence and reflection in the housing of FIG. 5. FIG. 7 is a cross-sectional view schematically illustrating a state in which coating layer are added to the housing of FIG. 5.

In the embodiment of the present invention, all or part of the housing may have a multi-layered cross-sectional structure including a color optical resin layer, a half-mirror coating layer, and an anti-reflection coating layer.

Referring to FIG. 3, the housing may have, for example, a structure in which six members are combined and the inside thereof is hollow, and some members of the housing, for example, the upper member 140 may have the above-mentioned multi-layered cross-sectional structure. Referring to FIG. 5, the upper member 140 may include a color optical resin layer 1401 for partially blocking visible light, a half-mirror coating layer 1402 provided on the upper surface of the color optical resin layer 1401, and an anti-reflection coating layer 1403 provided on the lower surface of the color optical resin layer 1401. Here, the upper surface means a side that is in contact with the user.

The color optical resin layer 1401 may have a function of blocking a certain amount of visible light incident thereon, and may be formed by curing a resin substrate including a polymer composition (pigment) that produces a coloring effect or by color deposition on the resin substrate.

The half-mirror coating layer 1402 may have a function of partially reflecting visible light incident thereon, and may be formed by being coated with a dielectric multilayer thin film or a metal film.

The dielectric multilayer thin film may be formed by laminating a high dielectric constant layer and a low dielectric constant layer and may include, for example, a dielectric oxide such as SiO, $SiO_2$, $ZrO_2$, or $TiO_2$. The metal film may be formed, for example, by depositing a Cr thin film, and dielectric thin films may be added to the upper and lower surfaces of the Cr thin film to serve as a protective layer of the Cr thin film.

The half-mirror coating layer 1402 may be formed by vacuum deposition, sputtering, evaporation coating, spin coating, or the like, but is not particularly limited to such a manufacturing method.

The anti-reflection coating layer 1403 reduces the visible light reflected into the upper member 140, thereby suppressing a side effect that the camera itself is reflected on the face recognition camera 400 or iris recognition camera 500 built in the housing.

The anti-reflection coating layer 1403 may consist of a single layer or multiple layer film made of a dielectric material consisting of, for example, SiO, $SiO_2$, $Si_3N_4$, $TiO_2$, $ZrO_2$, $Al_2O_3$, $MgF_2$, $Ta_2O_5$, or mixtures thereof, but is limited to these materials.

The upper member 140 includes the multilayer coating layer as described above. Thus, it is possible to prevent the user from watching the inside of the multi biometric terminal 100 (especially, the camera) so as not to cause psychological rejection or resistance while preventing a significant reduction in biometric information recognition rate by the camera even though the amount of light is partially reduced.

The ratio (b/a) of the incident amount (a) of visible light incident into the upper member 140 through the upper member 140 from the outside of the upper member 140 and the reflection amount (b) of visible light reflected by the upper member 140 from the inside of the upper member 140 and incident into the upper member 140 may be 30% or less. If the ratio (b/a) of the incident amount and the reflection amount exceeds 30%, internal reflection causes the internal member (e.g., camera or the like) to be photographed when the camera built in the housing photographs the user (face, iris, or the like). Hence, there is a problem that the biometric information is not recognized or the recognition rate is low.

Referring to FIG. 6, for example, if the color optical resin layer 1401 of the upper member 140 has a visible light attenuation rate of 50% and the half-mirror coating layer 1402 has a visible light reflectance of 20%, the incident amount (a) of visible light incident into the upper member 140 from the outside thereof is 30% and the reflection amount (b) of visible light reflected by the upper member 140 from the inside thereof is 3.6% (30%*50%*(20%+4%)). In this case, the ratio (b/a) of the incident amount to the reflection amount is 12%.

Meanwhile, the upper member 140 may further include an additional coating layer in addition to the above-mentioned coating layers. Referring to FIG. 7, if the anti-reflection coating layer positioned on the color optical resin layer 1401 is a first anti-reflection coating layer 1403, a second anti-reflection coating layer 1404 may be provided between the color optical resin layer 1401 and the half-mirror coating layer 1402. The internal reflection amount (b) of visible light can be further reduced by the second anti-reflection coating layer 1404.

In addition, a cured coating layer 1405 or an anti-fingerprint coating layer 1406 may be further provided on the upper surface of the half-mirror coating layer 1402.

Figure 8:
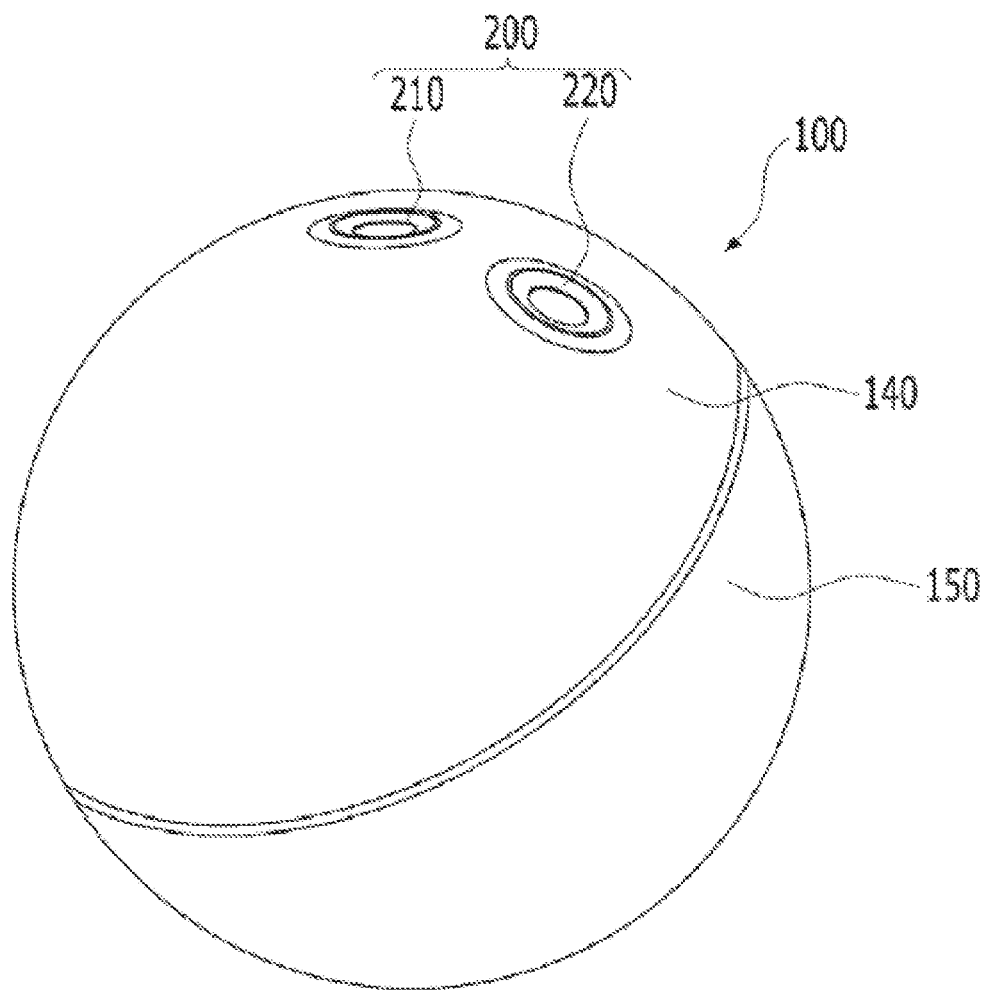
FIG. 8 is an assembled perspective view illustrating a multi biometric terminal according to another embodiment of the present invention.

Meanwhile, although the housing of the multi biometric terminal 100 is described as consisting of six members in the above embodiment, the present invention is not, of course, limited thereto. For example, as illustrated in FIG. 8, the upper member 140 and the lower member 150 may each have a hemispherical shape, and they may be directly fastened to have a single module or housing form. Besides, various structures are possible.

It is possible to implement an access control system using the multi biometric terminal described above. The access control system according to the present invention includes the multi biometric terminal having the host system as described above, and a gate for selecting a user who is identified from the host system to allow entry of the user.

Here, the gate may be a means, such as a swing door or a sliding door, capable of physically controlling the entry of the user, and the structure and shape thereof are not particularly limited as described above. In addition, the host system may have a biometric data input unit that, when a user's body approaches in a non-contact manner, receives a plurality of types of biometric data from the body, details thereof are as described above.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

Embodiments

The embodiments of the present invention have been described together in the best mode for carrying out the disclosure.

INDUSTRIAL APPLICABILITY

The present invention relates to a multi biometric terminal, and is industrially applicable since the multi biometric terminal is applicable to a variety of authentication systems and is reproducible.

The invention claimed is:

1. A multi biometric terminal comprising:
a host system capable of recognizing two or more physical features, wherein the host system comprises at least one processor configured to:
pre-register biometric data of a user;
acquire the biometric data of the user; and
compare the acquired biometric data with the pre-registered biometric data of the user to perform identification,
wherein, when a body of the user approaches in a non-contact manner, the at least one processor receives a plurality of types of biometric data from the body,
wherein the host system is accommodated in a single module or housing,
wherein the multi biometric terminal further comprises a biometric data storage database configured to back up the user's biometric data pre-registered in the host system,
wherein, when the host system is disconnected from the multi biometric terminal, the user's biometric data pre-registered in the host system is deleted, and
wherein, when the host system is reconnected to the multi biometric terminal, the user's biometric data backed up to the biometric data storage database is restored to the host system.

2. The multi biometric terminal according to claim 1, wherein the biometric data is two or more of fingerprint data, iris data, vein data, retina data, face image data, or hand geometry data.

3. The multi biometric terminal according to claim 1, wherein the at least one processor receives the plurality of types of biometric data from the user's body when the user looks at the multi biometric terminal while approaching a position close to the multi biometric terminal from a position away therefrom.

4. The multi biometric terminal according to claim 1, wherein the host system further comprises:
at least one fingerprint recognition camera;
a palm vein recognition camera spaced apart from the fingerprint recognition camera at a predetermined interval for photographing a palm; and an iris recognition camera or a face recognition camera positioned on or over one side of the palm vein recognition camera.

5. The multi biometric terminal according to claim 4, wherein the at least one fingerprint recognition camera includes:
   a first fingerprint recognition camera configured to photograph a predetermined number of fingerprints of fingers except for a thumb; and
   a second fingerprint recognition camera configured to photograph at least one fingerprint which is not photographed by the first fingerprint recognition camera.

6. The multi biometric terminal according to claim 4, wherein the iris recognition camera or the face recognition camera is driven by a pan-tilt driver.

7. The multi biometric terminal according to claim 1, wherein the at least one processor simultaneously identifies two or more types of acquired biometric data.

8. The multi biometric terminal according to claim 1, wherein the host system further comprises an ID display unit configured to display an identification result performed by the at least one processor.

9. The multi biometric terminal according to claim 1, further comprising a guide formed on a surface of the module or housing to guide an approach direction of a finger or palm of the user.

10. The multi biometric terminal according to claim 9, wherein the guide is configured to guide the approach direction of the finger or palm by sight or touch.

11. A multi biometric terminal capable of recognizing two or more physical features, comprising:
    at least one fingerprint recognition camera;
    a palm vein recognition camera spaced apart from the fingerprint recognition camera at a predetermined interval for photographing a palm; and
    an iris recognition camera or a face recognition camera spaced apart from the fingerprint recognition camera and the palm vein recognition camera at a predetermined interval for photographing an iris or a face image of a user, respectively,
    wherein the fingerprint recognition camera, the palm vein recognition camera, and the iris recognition camera or the face recognition camera are accommodated and modularized in a single housing,
    wherein the housing comprises:
    a color optical resin layer for partially blocking visible light;
    a half-mirror coating layer provided on an upper surface of the color optical resin layer; and
    an anti-reflection coating layer provided on a lower surface of the color optical resin layer.

12. An access control system comprising:
    a multi biometric terminal comprising a host system; and
    a gate for selecting a user identified from the host system to allow entry of the user,
    wherein the host system comprises at least one processor configured to pre-register biometric data of the user, and, when a body of the user approaches in a non-contact manner, receive a plurality of types of biometric data from the body,
    wherein the multi biometric terminal further comprises a biometric data storage database configured to back up the user's biometric data pre-registered in the host system,
    wherein, when the host system is disconnected from the multi biometric terminal, the user's biometric data pre-registered in the host system is deleted, and
    wherein, when the host system is reconnected to the multi biometric terminal, the user's biometric data backed up to the biometric data storage database is restored to the host system.

13. The access control system according to claim 12, wherein the host system is accommodated in a single module or housing.

14. The access control system according to claim 12, wherein the host system recognizes physical features using two or more types of biometric data of fingerprint data, iris data, vein data, retina data, face image data, or hand geometry data.

* * * * *